UNITED STATES PATENT OFFICE 2,451,645

FUNGICIDAL AND BACTERICIDAL COMPOSITIONS CONTAINING 1-(4'-ISOPROPYLBENZYL)-PIPERAZINE

Ferdinand B. Zienty and George W. Steahly, St. Louis, Mo., assignors to Monsanto Chemical Company, St. Louis, Mo., a corporation of Delaware No Drawing. Application May 24, 1947, Serial No. 750,382

12 Claims. (Cl. 167—33)

This invention relates to a novel composition 1-(4'-isopropylbenzyl)-piperazine and its acid salts and also to novel fungicidal and bactericidal compositions containing the novel compound or its acid salts.

One of the objects of the present invention is to provide a novel compound 1-(4'-isopropylbenzyl)-piperazine and its acid salts, possessing marked fungicidal and bactericidal activity. Another object is to provide a novel fungicidal and bactericidal compositions containing 1-(4'-isopropylbenzyl)-piperazine or its acid salts, and a carrier. A further object is to provide a wax composition suitable for the coating of paper, Cellophane, cheese and fruits to inhibit fungus and bacterial growth on such substances. Another object is to provide a novel fungicidal and bactericidal composition for the treatment of actinomycosis, furunculosis, and other fungus and bacterial infections in warm-blooded animals. A further object is to provide a novel composition for the control and inhibition of fungus and bacterial organisms in the drinking water for stock. A further object is to provide a novel agricultural fungicidal and bactericidal composition. A further object is to provide a novel composition for the treatment of textiles to render them resistant to fungus and bacterial growth.

Further objects will become apparent from the following description and examples.

According to the present invention, generally stated, we have found that the novel substance, 1-(4'-isopropylbenzyl)-piperazine having the formula:

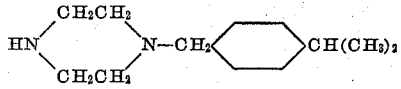

and its acid salts such as the monohydrochloride, monoacetate, dihydrochloride, diacetate, sulfate and phosphate, possess marked activity in the inhibition and control of the growth of fungus and bacterial organisms for a wide variety of applications.

1-(4'-Isopropylbenzyl)-piperazine may be prepared by any desired method, for example, by heating one mole of 4'-isopropylbenzyl chloride with five moles of piperazine at 120–130° C. and thereafter treating the reaction mixture with aqueous caustic soda solution and recovering the product from the reaction mixture by fractional distillation. The acid salts of the free base compound may be prepared by reacting the substance with an equivalent amount of the appropriate acid in a suitable solvent such as acetone or toluene. The acid salts may then be crystallized from the solution and thereby recovered.

In the preparation of the novel fungicidal and bactericidal composition of the present invention, the carrier may be selected from a wide variety of substances, depending primarily upon the particular application for which the composition is to be adapted. For example, in the treatment of fungus and bacterial infections on the skin of animals, it is desirable to use a suitable ointment base such as petrolatum and to disperse in that base an amount of 1-(4'-isopropylbenzyl)-piperazine which will effectively control the growth of the organism. For example, 0.1–15% of the compound may be employed in the petrolatum base for this purpose. In the treatment of drinking water for livestock such as chickens, hogs, and cattle, it is desirable to disperse approximately 0.1–2% of an acid salt of 1-(4'-isopropylbenzyl)-piperazine in the water. For agricultural spray purposes, it is desirable to disperse approximately 0.5–15% of 1-(4'-isopropylbenzyl)-piperazine, or preferably an acid salt such as the dihydrochloride of this compound, in water. The resulting spray solution may then be applied to the vegetation. As an alternative, the free base compound or an acid salt thereof may be dispersed to the extent of 0.5–5% in a solvent such as mineral oil and the concentrate thus formed may then be emulsified with water in suitable proportion such as one part of the compound per 200 parts of water and desirably in the presence of a suitable wetting agent such as cetyl dimethyl benzyl ammonium chloride or sodium lauryl benzene sulfonate.

Wax compositions possessing enhanced resistance to fungus and bacterial growth may be prepared by dispersing 1-(4'-isopropylbenzyl)-piperazine or its acid salts in a suitable wax composition such as paraffin or a combination of paraffin and a suitable resin such as copal. For this purpose, 0.1–5 parts of the free base compound or the equivalent amount of an acid salt thereof has been found satisfactory, although larger amounts may be employed as desired, depending upon the nature and extent of the bacterial or fungus environment.

A novel composition for the treatment of textiles to render them resistant to the growth of fungus and bacterial organisms may be provided by dispersing 1-(4'-isopropylbenzyl)-piperazine or an acid salt thereof such as the dihydrochloride, diacetate, sulfate, or phosphate in a suitable solvent such as acetone or toluene, or in the case of the acid salt, water, and immersing the textile in the solution. Subsequent to the immersion, the textile may be dried by any suitable means. If desired, a suitable wetting agent such as cetyl dimethyl benzyl ammonium chloride or sodium lauryl benzene sulfonate may be employed in the impregnating solution.

In addition to the illustrative compositions described hereinabove for the purpose of inhibiting and controlling fungus and bacterial infection, numerous other compositions embodying 1-(4'-isopropylbenzyl)-piperazine may be formulated, and the foregoing illustrations together with the examples appearing hereinafter, are to be construed merely as illustrative of the novel compositions of the present invention.

The following examples will serve to further illustrate the novel compounds and compositions of the present invention.

Example I

A mixture of 57 g. (0.337 mole) of 4-isopropylbenzyl chloride and 145 g. (1.69 moles) of piperazine was heated with agitation at 120–130° C. for 18 hours. The reaction mixture was treated with 32 g. of 50% aqueous caustic soda solution. Thereafter, the water layer was removed. The residual excess piperazine was removed from the reaction mixture by distillation and the product, 1-(4'-isopropylbenzyl)-piperazine, was recovered from the reaction mixture for fractional distillation; boiling point 155–165° C./9 mm. Yield 46.3 g. (63.2%). The product was then redistilled; boiling point 155–157° C./8–9 mm.

Example II

| | Parts by weight |
|---|---|
| 1-(4'-isopropylbenzyl)-piperazine | 0.1–15 |
| Petrolatum | Sufficient to make 100 |

The components were blended to form uniform mixtures and the resulting ointments were spread on the skin of livestock for the treatment of actinomycosis and furunculosis. The treatments were found to give marked inhibition of the growth of the organisms.

Example III

| | Parts by weight |
|---|---|
| 1-(4'-isopropylbenzyl)-piperazine | 0.5–15 |
| Cetyl dimethyl benzyl ammonium chloride | 0.01–1 |
| Water | Sufficient to make 100 |

Cotton duck fabric was immersed in the resulting solution and the fabric was thereafter dried. Exposure of the treated fabric to rot organisms such as *Chaetomium globosum*, *Aspergillus niger*, and *Metarrhizium sp.* indicated a mark inhibition of fungus growth on the treated fabric.

Example IV

| | Parts by weight |
|---|---|
| 1-(4'-isopropylbenzyl) - piperazine dihydrochloride | 0.5–5 |
| Water | Sufficient to make 100 |

This solution was applied to leather shoes infected with mold organisms. The results indicated a marked inhibition of mold growth on the shoes.

Example V

| | Parts by weight |
|---|---|
| 1-(4'-isopropylbenzyl)-piperazine | 0.5–15 |
| Mineral oil | Sufficient to make 100 |

The resulting concentrate was dispersed in water in the ratio of one part of the active ingredient to 500 parts of water and the mixture was then emulsified. The emulsion was sprayed on the fruit of apple trees. The results indicated a marked inhibition of fungus and bacterial growth as compared to untreated trees.

Example VI

| | Parts by weight |
|---|---|
| 1-(4'-isopropylbenzyl) - piperazine | 0.1–5 |
| Paraffin | 50 |
| Copal resin | 45–49.5 |

The paraffin was melted with the resin and the 1-(4'-isopropylbenzyl)-piperazine was dispersed in the resulting melt. The molten composition was then applied to paper, Cellophane, cheese, and fruit and the objects thus treated were subjected to fungus and bacterial activity. The results indicated a marked inhibition and control of the organism on the treated objects.

We claim:

1. A compound selected from the group consisting of 1-(4'-isopropylbenzyl)-piperazine and its acid salts.

2. 1-(4'-Isopropylbenzyl)-piperazine.

3. 1-(4'-Isopropylbenzyl)-piperazine dihydrochloride.

4. 1-(4'-Isopropylbenzyl)-piperazine sulfate.

5. A fungicidal and bactericidal composition comprising a substance selected from the group consisting of 1-(4'-isopropylbenzyl)-piperazine and its acid salts, and a carrier.

6. A fungicidal and bactericidal composition comprising a dispersion of a compound selected from the group consisting of 1-(4'-isopropylbenzyl)-piperazine and its acid salts, in a solvent.

7. A fungicidal and bactericidal wax composition comprising a compound selected from the group consisting of 1-(4'-isopropylbenzyl)-piperazine and its acid salts, and a wax.

8. A fungicidal and bactericidal textile treating composition comprising an aqueous solution of an acid salt of 1-(4'-isopropylbenzyl)-piperazine.

9. An agricultural fungicidal and bactericidal composition comprising an oil-in-water emulsion of a compound selected from the group consisting of 1-(4'-isopropylbenzyl)-piperazine and its acid salts.

10. An agricultural fungicidal and bactericidal composition comprising an oil-in-water emulsion of a compound selected from the group consisting of 1-(4'-isopropylbenzyl)-piperazine and its acid salts, and a wetting agent.

11. A process for making a fungicidal and bactericidal composition comprising dispersing a compound selected from the group consisting of 1-(4'-isopropylbenzyl)-piperazine and its acid salts in a liquid medium.

12. A process for making a fungicidal and bactericidal composition comprising dispersing a compound selected from the group consisting of 1-(4'-isopropylbenzyl)-piperazine and its acid salts in a waxy medium.

FERDINAND B. ZIENTY.
GEORGE W. STEAHLY.

No references cited.